R. B. WEAVER.
GEARING.
APPLICATION FILED JUNE 15, 1914.
1,136,069.
Patented Apr. 20, 1915.
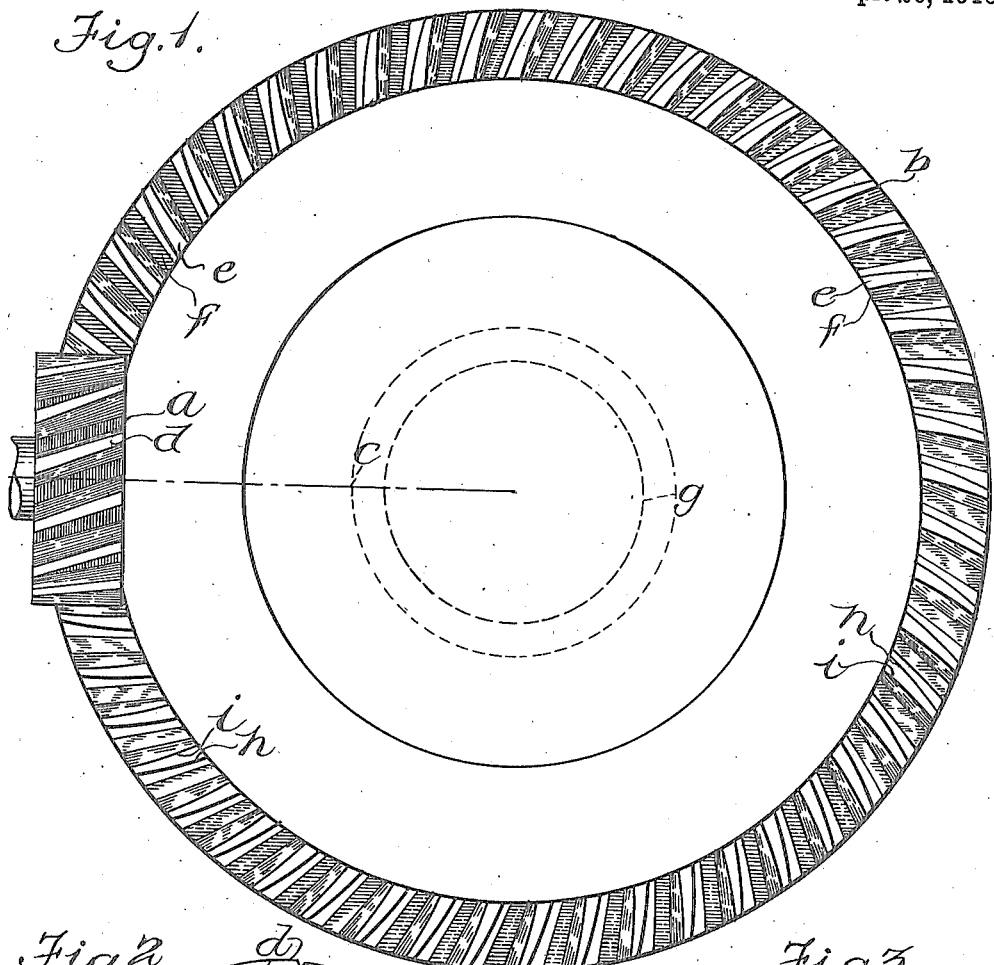
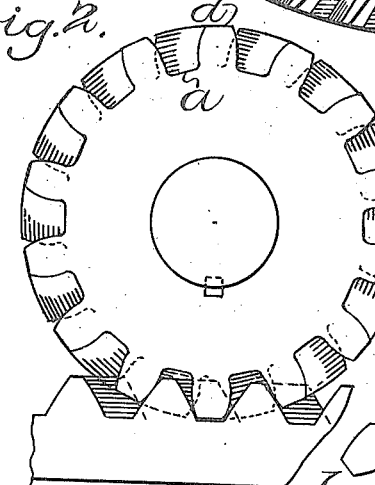
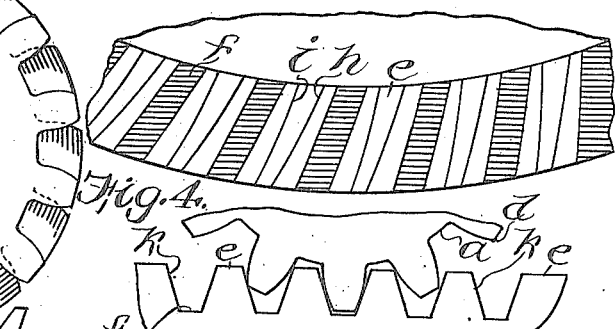
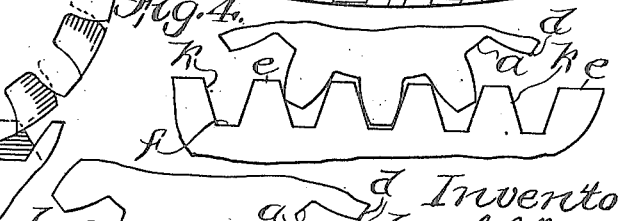
Witnesses:
Inventor:
R. B. Weaver

UNITED STATES PATENT OFFICE.

ROBERT B. WEAVER, OF DETROIT, MICHIGAN, ASSIGNOR TO TIMKEN-DETROIT AXLE COMPANY, OF DETROIT, MICHIGAN, A CORPORATION OF OHIO.

GEARING.

1,136,069.      Specification of Letters Patent.      Patented Apr. 20, 1915.

Application filed June 15, 1914. Serial No. 845,037.

*To all whom it may concern:*

Be it known that I, ROBERT B. WEAVER, a citizen of the United States, and resident of Detroit, in the county of Wayne and State of Michigan, have invented certain new and useful Improvements in Gearing, of which the following is a specification.

The object of the present invention is to produce a gearing or gear couple, consisting of a pinion having helical teeth and a gear having a circular line of teeth on one of its plane faces of such form and arrangement as to mesh with the teeth of the helical pinion when said pinion and gear are so placed that their axes intersect.

In the drawings in which are illustrated a form of my invention, Figure 1 is a plan view of a gear couple embodying my invention. Fig. 2 is an elevation as seen from the left of Fig. 1. Fig. 3 is a plan view on a larger scale of a portion of the line of teeth on the large gear. Figs. 4 and 5 are diagrammatic figures similar to Fig. 2, illustrating the difference in character between the inner and the outer ends of the teeth on the large gear.

Like reference characters designate the same parts in all the figures of the drawing.

In the drawings $a$ represents a pinion having inclined or helical teeth, and $b$ represents a gear forming the other element of the couple of which the pinion $a$ is one member or element. The gear $b$ is a crown gear; that is, its teeth project from one of the faces of the plane disk of which the gear is composed and are all in the same plane perpendicular to the axis of the gear; in other words, this gear is not a bevel gear.

The pinion and gear are arranged so that their axes intersect, as appears from Fig. 1, where the broken line $c$, representing the prolongation of the axis of the pinion, is shown as crossing the center of the gear. The pinion $a$, being a helical pinion, has teeth $d$, which are inclined to its axis in the form of sections of helices. The teeth $e$ of the gear, and the spaces $f$ between such teeth, are disposed so as to mesh with the inclined teeth $d$ of the pinion $a$, and so are not radial to the gear but are inclined to the radii of the gear at the ends of which they are respectively located. The bottoms of the spaces $f$ between the teeth are in the same plane perpendicular to the axis of the gear and their intersection with the side faces of the adjacent teeth are approximately straight and parallel and tangent to a circular line concentric with the gear, as the broken circular line shown at $g$. The corners or angles between the side and top faces of the teeth are more or less curved, the outer edge or corner $h$ of each tooth having a convex curvature and the opposite edge or corner $i$ having a concave curvature. The sides of the teeth from bottom to top are approximately straight lines, which at the inner end are more steeply inclined to the plane of the gear than at the outer end.

Referring to Fig. 4, which shows the inner ends of a few of the teeth of the gear in relation to the corresponding ends of the teeth of the pinion, it will be seen that the side edges $k$ of the teeth are inclined at an angle of approximately fifteen degrees to the vertical, while the side edges 1 of the opposite ends of the teeth make a greater angle with the vertical, which in the present instance is not far from thirty degrees. The pitch line of the gear is near the inner ends of the teeth $e$, and on this line the speeds of the pinion and gear are nearly equal, while at the outer ends of the gear teeth, these ends being at the circumference of the gear, the linear speed of the gear is greater than that of the pinion; wherefore greater clearance is required, and the teeth are spread apart with more sloping sides, as clearly shown in Fig. 5. Between the inner and outer ends of the teeth, the sides thereof form warped planes having progressively greater obliquity with respect to the vertical from their inner to their outer ends. A gear couple having the characteristics hereinbefore described is capable of serving uses for which no other gear couple with which I am acquainted is adapted. It combines the advantages of the crown gear with those of the helical pinion, and allows of the pinion and gear being so placed that their axes are in the same plane and therefore intersect. Such a gearing is very quiet as compared with straight spur gearing and performs its work with the minimum of friction.

The term "vertical" as used herein and in the following claims is used in a relative sense, meaning a direction perpendicular to the plane of the gear and parallel to the axis thereof.

Having now described an embodiment of my invention, although without attempting to illustrate and describe all possible embodiments thereof, or all the modes of its use, I declare that what I claim is:

1. A gear couple comprising a pinion and a crown gear arranged with their axes in the same plane and approximately perpendicular to one another, and with their teeth inclined.

2. Gearing comprising a pinion having helically inclined teeth and a gear having a circular line of teeth arranged in a plane parallel to the axis of the pinion, such gear being arranged with its axis intersecting the axis of the pinion.

3. Gearing consisting of a pinion having inclined teeth and a crown gear arranged with its axis in the same plane with and intersecting the axis of the pinion, and its teeth spirally inclined.

4. A crown gear having teeth so formed that the spaces between the teeth are approximately straight, approximately uniform in width, and arranged in lines tangent to a circle concentric with the gear, and the sides of the teeth having gradually increasing divergence from the vertical at successive points from their inner to their outer ends.

5. A gear having teeth arranged in a plane perpendicular to the axis of the gear and spirally disposed with respect to the said axis, said teeth being approximately straight from inner to outer ends at their bases and being curved from their inner to their outer ends at the edges of their top faces, the curvature of one edge being convex and of the opposite edge being concave.

In testimony whereof I have affixed my signature, in presence of two witnesses.

ROBERT B. WEAVER.

Witnesses:
 LESLIE WILLIAMS,
 J. M. READY.